Patented Dec. 20, 1932

1,891,317

UNITED STATES PATENT OFFICE

ALBIN PETER, OF BASEL, SWITZERLAND, ASSIGNOR TO THE FIRM OF CHEMICAL WORKS FORMERLY SANDOZ, OF BASEL, SWITZERLAND

PROCESS FOR THE PREPARATION OF NEW CONDENSATION PRODUCTS OF THE ANTHRAQUINONE SERIES

No Drawing. Application filed July 7, 1931, Serial No. 549,325, and in Germany July 18, 1930.

It is known that 1-aminoanthraquinone can be condensed with malonic ester to ω-carbethoxy-acetylaminoanthraquinone. By boiling this compound with an aqueous solution of caustic soda, a splitting of water and saponification of the ester occurs and as final product the carboxyanthrapyridone is obtained (see German Patent No. 250,885).

It is further known that by heating 1-aminoanthraquinone with acetoacetic ester in presence of sodium methylate a pyridino-anthrone carboxylic acid can be obtained (German Patent No. 185,548).

The acetoacetic ester and the malonic ester may be considered as representatives of a class of bodies, characterized in that they possess the group —CO—CH$_2$—CO—R and they are, therefore, designed in the present description as methylenecarboxylic acid esters. From the above statements it can be concluded that the 1-aminoanthraquinone in absence of condensing agents is acylated by the methylene carboxylic acid esters, whereas in presence of strong alkaline reacting condensing agents the cyclization to pyridine- and pyridone compounds occurs simultaneously with the saponification of the remaining ester group.

It has now been found that new valuable anthraquinone derivatives can be prepared by condensing anthraquinone compounds containing at least one amino respectively alkylamino group in α-position with esters of the formula R$_1$—CO—CH$_2$—CO—O—alkyl, wherein R$_1$ represents phenyl, alkyl or alkoxy groups, in presence or in absence of solvents respectively of diluting agents and small quantities of condensing agents, preferably of a weak basic character. The new compounds are not obtained when carefully purified starting materials are heated without an addition of a condensing agent. Contrarily to this, by using a technical starting material, an addition of condensing agents is often superfluous.

As suitable condensing agents the following compounds may advantageously be employed: formates, acetates, nitrites, carbonates, borates and sulphites of alkali metals and other weakly basic reacting compounds, like calcium oxide, magnesium oxide.

The new products are probably substituted anthrapyridones for the following reasons:

As already said above, by heating 1-aminoanthraquinone with malonic ester, ω-carbethoxyacetylamino - anthraquinone of the melting point 169–170° C. is obtained. If the condensation is carried out in presence of a small quantity of sodium acetate, from the melt besides alcohol some acetic ester distils off; this can be explained in the manner that the water produced during the cyclization to pyridone, saponifies a further molecule of malonic ester to its monoester, which is itself split to acetic ester and carbon dioxide. The compound thus obtained possesses the melting point of 315–316° C. under decomposition. It is probably the carbethoxyanthrapyridone and its formation may be formulated in the following manner.

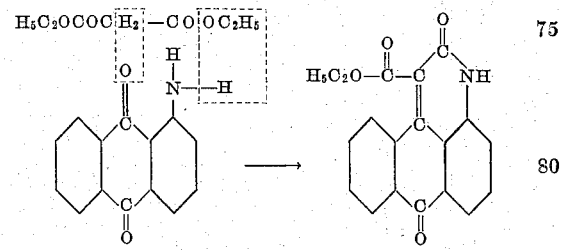

This formula corresponds to the results of the analysis (see Example 1).

By heating for instance 1-methylamino-4-bromoanthraquinone with acetoacetic ester in presence of a small quantity of sodium acetate, a splitting of water and alcohol also occurs. The splitting of water is remarked by the fact that acetone distils from the melt. For this reason and based on the analysis of the product, the reaction may be formulated in the following manner:

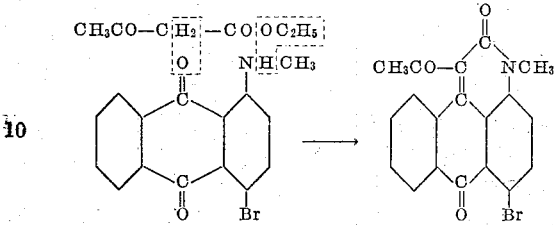

In presence of the methyl group the reaction described in the German Patent No. 185,548 forming a pyridinoanthrone is made impossible. It is further easy to show that the products obtained from aminoanthraquinones not substituted in the amino group are not pyridinoanthrones. So for instance, from 1-amino-2-methyl-4-bromoanthraquinone a compound of the formula $C_{19}H_{12}O_3NBr$ is obtained, which formula is based on the content of bromine controlled by analysis. For the formulation of the reaction there may be two possibilities:

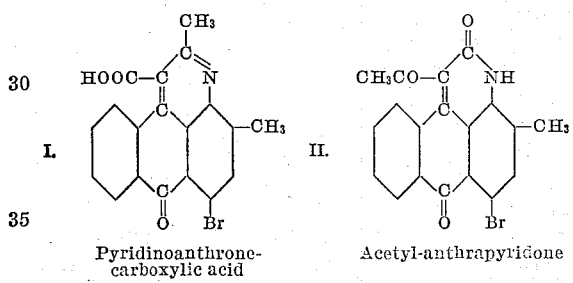

I. Pyridinoanthrone-carboxylic acid  II. Acetyl-anthrapyridone

It is to be noted that under the conditions chosen the carbethoxy group is probably not saponified (the water produced during the cyclization reacts with the excess of acetoacetic ester and yields some acetone, which was characterized as a p-nitrophenylhydrazone) and that the product obtained is insoluble in a sodium carbonate solution, whereas the product prepared according to the German Patent No. 185,548 and which is a pyridinoanthrone-carboxylic acid, is soluble in a sodium carbonate solution. The Formula II seems to be, therefore, the right formula for the product obtained.

The new compounds prepared by the present process may be used for the manufacture of dyestuffs.

The following examples, without being limitative, illustrate the present process, the parts being by weight.

*Example 1*

A mixture consisting of 1 part of α-aminoanthraquinone, 0.01 part of sodium acetate and 2 parts of diethylmalonic ester is boiled under good stirring. The apparatus carries a reflux condenser which allows during the condensation to distil therethrough only the produced mixture of alcohol and acetic ester. When nothing more is distilling, the melt is allowed to cool down to 100° C. and the thick mass obtained is diluted with 2 parts of alcohol, filtered, washed with alcohol and hot water and dried. The thus obtained carbethoxypyridone constitutes in dry state a yellow crystallized powder of the melting point of 312–313° C. (decomposition). When recrystallized from nitrobenzene it yields honey yellow crystals which melt under destruction at 315–316° C. On analysis the following results have been obtained:

$C_{19}H_{13}O_4N$ calculated C=71.47% H=4.11%
found C=71.71% H=3.69%

*Example 2*

4 parts of 1:5-diaminoanthraquinone, 10 parts of acetoacetic ester, 5 parts of nitrobenzene, 0.1 part of sodium acetate are heated to 160–190° C. until no more alcohol and acetone are distilling from the melt. The reaction product is then allowed to cool down to about 100° C., diluted with 10 parts of alcohol, filtered, washed and dried. The product is probably a dianthrapyridone and constitutes in dry state a crystallized brown powder. It does not melt at temperatures zelow 360° C. and is insoluble in the usual organic solvents and even in quinoline. Its solution in concentrated sulphuric acid is yellow and in borosulphuric acid brick red with a fluorescence.

*Example 3*

100 parts of 1-methylamino-4-bromoanthraquinone, 200 parts of malonic ester and 0.5 part of sodium acetate are condensed as described in the Examples 1 and 2 at a temperature of 180–195° C. At the end of the reaction the melt is allowed to cool down to about 100° C., diluted with 100 parts of alcohol, allowed then to cool down to 20° C. and worked up as described in Example 1. The carbethoxymethyl-4-bromoanthrapyridone obtained in this way, is a yellow powder of F. P. 138–185° C. Recrystallized from alcohol it has the form of a felt of fine prisms of F. P. 184–185° C.

The analysis gave the following results:

$C_{20}H_{11}O_4NBr$ calculated Br=19.40%
found Br=19.00; 19.34%.

By condensing 1-methylamino-4-bromoanthraquinone with acetoacetic ester at a temperature of 160–190° C., the respective acetylmethyl-4-bromoanthrapyridone is obtained. In dry state it forms brown prisms of F. P. 240–241° C.; when recrystallized from chlorobenzene it shows the F. P. 242–243° C.

On analysis, the following results have been obtained:

$C_{19}H_{12}O_3NBr$: calculated Br=20.92%
found Br=20.93; 20.94%.

From 1-methylamino-5-chloroanthraquinone and acetoacetic ester is obtained the 5-chloro-1-methylanthraacetylpyridone in form of yellow needles of F. P. 263° C., which when recrystallized from chlorobenzene melt at 265° C. On analysis the following results have been obtained:

$C_{19}H_{12}O_3NCl$ calculated Cl=10.50%
found Cl=10.76; 10.71%.

The condensation proceeds in a similar way, if sodium acetate is replaced by potassium acetate or sodium carbonate.

Example 4

100 parts of 1-amino-2-methyl-4-bromoanthraquinone, 1 part of sodium carbonate, 100 parts of malonic ester and 50 parts of nitrobenzene are boiled for one hour. During the temperature rises up from 170° to 200°, a mixture of alcohol and acetic ester is distilled off and the red starting material is nearly quantitatively transformed into the yellow pyridone. In dry state it is crystallized in small leaves of F. P. 311° (decomposition); when recrystallized from nitrobenzene brown prisms of F. P. 317° C. (decomposition) are obtained. An analysis has given the following results:

$C_{20}H_{14}O_4NBr$ calculated Br=19.40%
found Br=19.43; 19.35%.

Instead of sodium carbonate as condensing agent, compounds like calcium oxide, magnesium oxide, sodium phosphate, sodium sulphite etc. may be employed.

By using the acetoacetic ester the respective acetyl-2-methyl-4-bromoanthrapyridone is obtained, whereby during the condensation a certain amount of acetone is distilling away. In dry state it constitutes an orange crystallized compound difficulty soluble in nitrobenzene. When recrystallized from nitrobenzene it yields yellow needles and prisms which, when heated to 350° C., are decomposed and become black colored. An analysis gave the following results:

$C_{19}H_{12}O_3NBr$ calculated Br=20.92%
found Br=20.57; 20.87%.

From 1-amino-2.4-dibromoanthraquinone and malonic ester there is obtained the carbethoxy-2.4-dibromoanthrapyridone of F. P. 292° C. (decomposition), which, when recrystallized from nitrobenzene yields great rhomboeders of F. P. 299° C. (decomposition). An analysis gave the following results:

$C_{19}H_{11}O_4NBr_2$ calculated Br=33.53%
found Br=33.75; 33.51%.

With acetoacetic ester the 1-amino-2.4-dibromoanthraquinone is condensed to acetyl-2.4-dibromoanthrapyridone, consisting of brown crystals of F. P. 333° (decomposition) and which, when recrystallized from nitrobenzene, yields yellow leaves of F. P. 337° C. (decomposition). An analysis shows the following results:

$C_{18}H_9O_3NBr_2$ calculated Br=35.77%
found Br=35.73; 35.52%.

The condensations to the compounds above cited may also be carried out at 160° C., if the melts are heated some hours longer.

Example 5

20 parts of 1-amino-4-methoxyanthraquinone, 0.5 part of sodium acetate, 40 parts of acetoacetic ester and 20 parts of nitrobenzene are heated to 170–185° C. until no more alcohol and acetone are distilling away. The product obtained is the acetyl-4-methoxyanthrapyridone of the F. P. 316° C. (decomposition); recrystallized from nitrobenzene it gives yellow needles of F. P. 317° C. (decomposition).

With malonic ester there is obtained the carbethoxy-4-methoxyanthrapyridone of the F. P. 292° C. (decomposition); recrystallized from nitrobenzene it yields yellow needles and prisms of F. P. 298° C. (decomposition). An analysis gave the following results:

$C_{20}H_{15}O_5N$ calculated C=68.8%; H=4.29%.
found C=68.99; 68.80%.
H=4.57; 4.42%.

From 1:5-aminooxyanthraquinone and malonic ester there is obtained the carbethoxy-5-oxyanthrapyridone in form of olive brown leaves or sheets of F. P. 303° C. (decomposition), which, when recrystallized from nitrobenzene, give yellow leaves of the F. P. 311° C. (decomposition).

From acetoacetic ester and 1:5-aminooxyanthraquinone there is obtained the 5-oxyanthraacetylpyridone in form of a brown powder of the F. P. 302° C. (decomposition), which, when recrystallized from nitrobenzene, gives yellow needles of the F. P. 306° C. (decomposition).

Example 6

In a similar manner as the above cited aminoanthraquinones, the aminoarylaminoanthraquinones may be condensed. By heating for example 20 parts of 1-amino-2-bromo-4-p-toluidoanthraquinone with 0.5 part of sodium acetate, 40 parts of malonic acid and 20 parts of nitrobenzene up to 170–190° C., the 4-p-toluido-2-bromoanthracarbethoxpyridone is obtained. The same is a bluish-red powder, soluble in alcohol with a bluish red coloration.

The respective acetylpyridone is more difficultly soluble; it is dissolved by hot nitrobenzene with a reddish violet coloration and yields clear red needles.

Instead of 1-amino-2-bromo-4-p-toluidoanthraquinone other aryl-aminoanthraquinones such as the anilido-, xylidino-, chloranilido-, amidophenolether-, cresolether-, phenylenediamido- and other similar derivatives may be used, whereby new carbethoxy- and acetyl derivatives are obtained. By replacing the above cited compounds by 1-amino-2-methyl-4-arylaminoanthraquinones or by 1-amino-4-arylamino- and 1-amino-5-arylaminoanthraquinones, the respective new pyridones may easily be prepared.

Example 7

By heating during 1 hour 20 parts of 1-amino-2-methyl-4-bromoanthraquinone with 28 parts of benzoylacetic ester, 10 parts of nitrobenzene and 0.2 part of sodium acetate up to 170–200° C., whereby the alcohol is allowed to distil off, the benzoylpyridone is obtained in form of a yellow powder of nearly quadratic crystals, which, when neutralized from nitrobenzene, give yellow glistening crystals which, when seen under microscope, appear in form of lemon yellow rhombic tables. The product does not melt below 350° C. An analysis afforded the following results:

$C_{24}H_{14}O_3N$ Br calculated Br=18.00%; found Br=17.77; 17.66%.

The properties of the new products obtained according to the examples are shown in the following table:

condensation products of the anthraquinone series, consisting in condensing anthraquinone derivatives of the general formula:

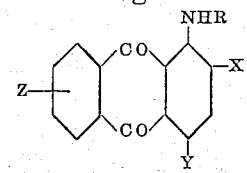

wherein R represents hydrogen, alkyl, X hydrogen, halogen, alkyl, alkoxy, Y hydrogen, halogen, hydroxy, alkoxy, amino, alkylamino and an arylamino group of the benzene series, and Z hydrogen, halogen, hydroxy, alkoxy, amino, alkylamino and an arylamino group of the benzene series, with esters of the formula: $R_1$—CO—$CH_2$—CO—O—alkyl, wherein $R_1$ represents alkyl, alkoxy and phenyl, in presence of condensing agents of a weak basic character.

2. A process for the manufacture of new condensation products of the anthraquinone series, consisting in condensing anthraquinone derivatives of the general formula:

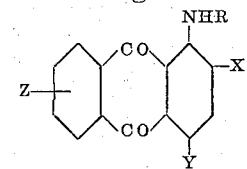

Condensation of malonic ester

| With | F. P. of the crystallized substance | Solution in sulphuric acid | +boric acid | Microscopic sight |
|---|---|---|---|---|
| 1-aminoanthraquinone | 315–316° C. decomposition | Yellow | Lemon yellow | Honey yellow cystals |
| 1:4-aminomethoxyanthraquinone | 298° C. decomposition | Yellow | Orange | Yellow lancets and prisms |
| 1:5-aminooxyanthraquinone | 311° C. decomposition | Orange | Bluish red | Yellow leaves |
| 1:4-methylaminobromoanthraquinone | 184–185° C. | Yellow | Lemon yellow | Felt of fine prisms |
| 1-amino-2-methyl-4-bromoanthraquinone | 317° C. decomposition | Yellow | Yellow | Brown prisms |
| 1-amino-2:4-dibromoanthraquinone | 299° C. decomposition | Yellow | Yellow | Great brown rhomboeders |
| 1-amino-2-bromo-4-p-toluidoanthraquinone | --- | Violet | Bluish green | Little globular aggregates |

Condensation of acetoacetic ester

| With | F. P. of the crystallized substance | Solution in sulphuric acid | + boric acid | Microscopic sight |
|---|---|---|---|---|
| 1:5-diaminoanthraquinone | >360° C. | Green yellow | Brick-red with fluorescence | Brown globular granules |
| 1:4-aminomethoxyanthraquinone | 317° C. decomposition | Yellow | Brick-red | Yellow lancets |
| 1:5-aminooxyanthraquinone | 306° C. decomposition | Orange | Bluish red | Brownish yellow lancets |
| 1:5-methylaminochloroanthraquinone | 265° C. | Yellow | Golden yellow | Light yellow lancets |
| 1:4-methylaminobromoanthraquinone | 242–243° C. | Golden yellow | Orange | Yellow prisms |
| 1-amino-2-methyl-4-bromoanthraquinone | >350° C. decomposition | Yellow | Orange | Yellow lancets and prisms |
| 1-amino-2:4-dibromoanthraquinone | 337° C. decomposition | Yellow | Orange | Yellow leaflets |
| 1-amino-2-bromo-4-p-toluidoanthraquinone | --- | Bluish violet | Green | Light red needles |

What I claim is:—

1. A process for the manufacture of new condensation products of the anthraquinone series, consisting in condensing anthraquinone derivatives of the general formula wherein R represents hydrogen and alkyl, X hydrogen, halogen, alkyl, alkoxy, Y hydrogen, halogen, hydroxy, alkoxy, amino, alkylamino and an arylamino group of the benzene series, and Z hydrogen, halogen, hydroxy, alkoxy, amino, alkylamino and an arylamino group of the benzene series, with esters of the formula: $R_1$—CO—$CH_2$—CO—O—alkyl, wherein $R_1$ represents alkyl, alkoxy and phenyl, in presence of condensing agents of a weak basic character and of organic solvents.

3. A process for the manufacture of new condensation products of the anthraquinone series, consisting in condensing anthraquinone derivatives of the general formula:

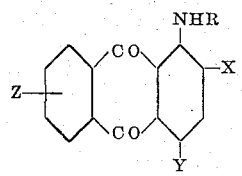

wherein R represents hydrogen and alkyl, X hydrogen, halogen, alkyl, alkoxy, Y hydrogen, halogen, hydroxy, alkoxy, amino, alkylamino and an arylamino group of the benzene series, Z hydrogen, halogen, hydroxy, alkoxy, amino, alkylamino and an arylamino group of the benzene series, with malonic ester in presence of condensing agents of weak basic character and of organic solvents.

4. A process for the manufacture of new condensation products of the anthraquinone series, consisting in condensing anthraquinone derivatives of the general formula:

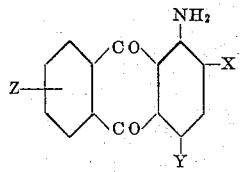

wherein X represents hydrogen, halogen, alkyl, alkoxy, Y hydrogen, halogen, hydroxy, alkoxy, amino, alkylamino and an arylamino group of the benzene series, Z hydrogen, halogen, hydroxy, alkoxy, amino, alkylamino and an arylamino group of the benzene series, with malonic ester in presence of condensing agents of weak basic character and of organic solvents.

5. A process for the manufacture of new condensation products of the anthraquinone series, consisting in condensing anthraquinone derivatives of the general formula:

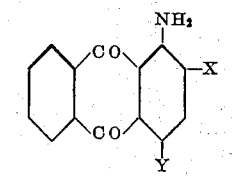

wherein X represents hydrogen, halogen, alkyl, alkoxy and Y hydrogen, halogen, hydroxy, alkoxy, amino, alkylamino and an arylamino group of the benzene series, with malonic ester in presence of condensing agents of weak basic character and of organic solvents.

6. A process for the manufacture of a new condensation product of the anthraquinone series, consisting in condensing 1-amino-2:4-dibromoanthraquinone with malonic ester in presence of condensing agents of a weak basic character and of organic solvents.

7. A process for the manufacture of a new condensation product of the anthraquinone series, consisting in condensing 1-amino-2-methyl-4-bromoanthraquinone with malonic ester in presence of condensing agents of a weak basic character and of organic solvents.

8. A process for the manufacture of a new condensation product of the anthraquinone series, consisting in condensing 1-amino-2-bromo-4-p-tolylaminoanthraquinone with malonic ester in presence of condensing agents of a weak basic character and of organic solvents.

9. As new articles of manufacture the condensation products of the general formula:

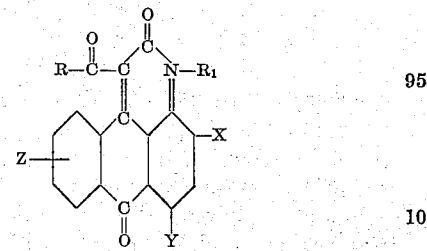

wherein R represents alkyl, alkoxy and phenyl, $R_1$ hydrogen, alkyl, X hydrogen, halogen, alkyl, alkoxy, Y hydrogen, halogen, hydroxy, alkoxy, amino, alkylamino and an arylamino group of the benzene series, and Z hydrogen, halogen, hydroxy, alkoxy, amino, alkylamino and an arylamino group of the benzene series, which are in dry state well crystallized compounds, insoluble in water, more or less soluble in organic solvents with yellow, red to red violet coloration and in concentrated sulphuric acid with a yellow, red, violet, and blue coloration, and unable to yield leuco-anthraquinone derivatives when heated in alkaline solutions of sodium hydrosulphite.

10. As new products the carbethoxyanthrapyridones of the general formula:

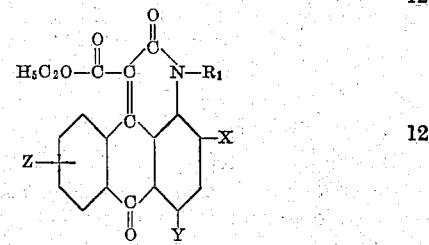

wherein $R_1$ represents hydrogen, alkyl, X hydrogen, halogen, alkyl, alkoxy, Y hydrogen, halogen, hydroxy, alkoxy, amino, alkylamino and an arylamino group of the benzene series, and Z hydrogen, halogen, hydroxy, alkoxy, amino, alkylamino and an arylamino group of the benzene series, which are in dry state well crystallized compounds, insoluble in water, more or less soluble in organic solvents with yellow, red to red violet coloration and in concentrated sulphuric acid with a yellow, red, violet, and blue coloration, unable to yield leuco-anthraquinone derivatives when heated in alkaline solutions of sodium hydrosulphite, and which give, when heated with concentrated sulphuric acid, by splitting off of the ester group, anthrapyridone carboxylic acids.

11. As new products the carbethoxyanthrapyridones of the general formula:

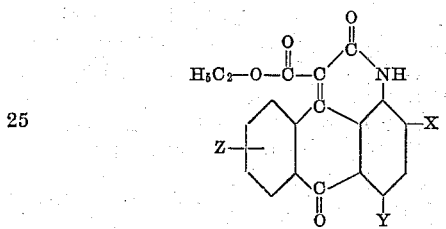

wherein X represents hydrogen, halogen, alkyl, alkoxy, Y hydrogen, halogen, hydroxy, alkoxy, amino, alkylamino and an arylamino group of the benzene series, and Z hydrogen, halogen, hydroxy, alkoxy, amino, alkylamino- and an arylamino group of the benzene series, which are in dry state well crystallized compounds, insoluble in water, more or less soluble in organic solvents with yellow, red to red violet coloration and in concentrated sulphuric acid with a yellow, red, violet and blue coloration, unable to yield leuco-anthraquinone derivatives when heated in alkaline solutions of sodium hydrosulphite, and which give, when heated with concentrated sulphuric acid, by splitting off of the ester group, anthrapyridone carboxylic acids.

12. As a new product the compound of the formula:

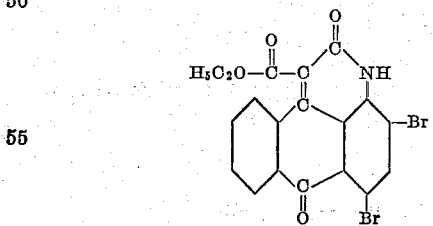

which constitutes in dry state a brown crystallized product of the F. P. 299° C. (under destruction), being, when recrystallized from nitrobenzene, soluble in concentrated sulphuric acid with a yellow coloration, which remains yellow on addition of boric acid.

13. As a new product the compound of the formula:

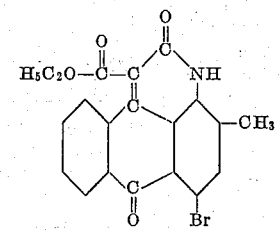

which constitutes in dry state a brown crystallized product of the F. P. 317°, being, when recrystallized from nitrobenzene, soluble in concentrated sulphuric acid with a yellow coloration, which remains yellow on addition of boric acid.

14. As a new product the compound of the formula:

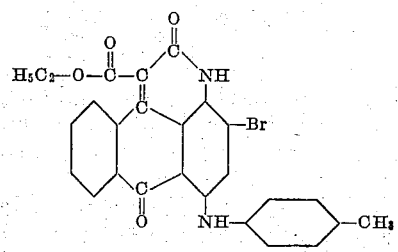

which constitutes in dry state a blue red powder, soluble in concentrated sulphuric acid with a violet coloration, which becomes blue-green on addition of boric acid.

In witness whereof I have hereunto signed my name this 26th day of June, 1931.

ALBIN PETER.